United States Patent [19]

Kyte

[11] 4,424,641

[45] Jan. 10, 1984

[54] FEED POT LID

[76] Inventor: Garrett J. Kyte, Ewell, Md. 21824

[21] Appl. No.: 66,661

[22] Filed: Aug. 15, 1979

Related U.S. Application Data

[63] Continuation of Ser. No. 866,914, Feb. 3, 1978, abandoned.

[51] Int. Cl.[3] .................. E05D 7/084; A01K 69/06
[52] U.S. Cl. ............................... 43/102; 49/254; 119/18; 220/331
[58] Field of Search .................. 43/44.99, 100, 102, 43/103, 105, 55, 56; 220/331; 24/251; 119/17, 18, 20; 217/59; 49/254, 257

[56] References Cited

U.S. PATENT DOCUMENTS

| | | | |
|---|---|---|---|
| 928,381 | 7/1909 | Griffin et al. | 217/59 |
| 1,760,936 | 6/1930 | Dean | 119/17 |
| 2,121,231 | 6/1938 | Hartog | 220/331 |
| 2,123,471 | 7/1938 | Lewis | 43/100 |
| 2,533,617 | 12/1950 | Palmer | 43/100 |
| 2,629,201 | 2/1953 | Runkle | 43/100 |
| 2,731,761 | 1/1956 | Marshall | 43/100 |
| 2,813,508 | 11/1957 | Hobbs | 119/17 |
| 3,149,814 | 9/1964 | McGinty et al. | 220/331 |
| 3,417,861 | 12/1968 | Levy | 220/331 |

*Primary Examiner*—Nicholas P. Godici
*Assistant Examiner*—Marc Hodak
*Attorney, Agent, or Firm*—John W. Huckert

[57] ABSTRACT

A feed pot lid preferably of one piece, the center of which is approximately three fourths round with the remaining one fourth of the center part being straight, the straight part having an extension therefrom which points away from the center, then loops, and then points back towards the center. On the opposite side of the center part there is another extension which points away from the center, and then loops back toward the center to make a hook. The lid is used with a wire mesh type marine life trap to cover the feed pot bait opening and permits the fastening and unfastening of the lid and opening of the lid in a convenient manner.

11 Claims, 6 Drawing Figures

FEED POT LID

This is a continuation of application Ser. No. 866,914 filed Feb. 3, 1978, now abandoned.

BACKGROUND OF THE INVENTION

This invention is called a Feed Pot Lid, for use on crab pots, eel pots, fish pots, or lobster pots. The purpose of the Feed Pot Lid is to hold bait in the feed pot.

SUMMARY OF THE INVENTION

A Feed Pot Lid, is made in one piece. The center is approximately three fourths round. The one fourth straight part of the center, has an extension which points away from the center, then loops, and points back to the center. On the opposite end of the center part, there is another extension, which points away from the center also, and loops back toward the center, making a hook.

The Feed Pot lid is to be fastened to the crab pot, fish pot, ell pot, or lobster pot, over the opening of the feed pot. The Feed Pot Lid can be opened to remove bait from the feed pot, and closed and fastened to hold bait in the feed pot of the crab pot.

BRIEF DESCRIPTION OF THE DRAWINGS

The Feed Pot Lid in the preferred embodiment is manufactured in one piece. A description is given of the drawings.

The Feed Pot Lid is manufactured from sheets of aluminum, or tin, or made from plastic. When made from plastic, the plastic is poured into moulds. The preferred width is 6 inches, and the length over all (installed) is 8,⅜ inches. When made of tin or aluminum, the preferred thickness is 1/32 of one inch. When made of plastic, the preferred thickness is 1/16 of one inch.

Figure 1:
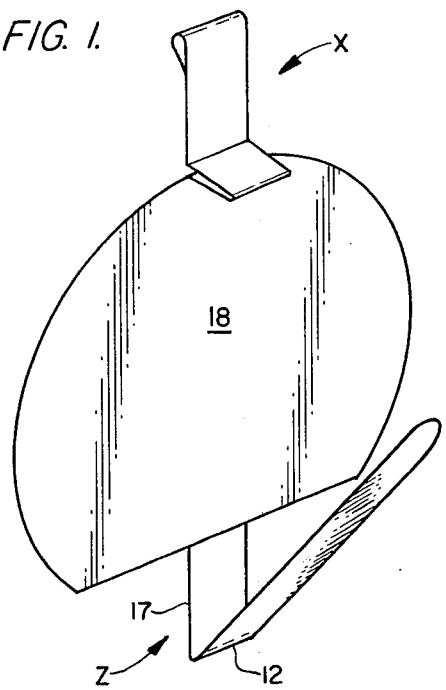
FIG. 1 shows the top of the feed pot lid.
Figure 2:
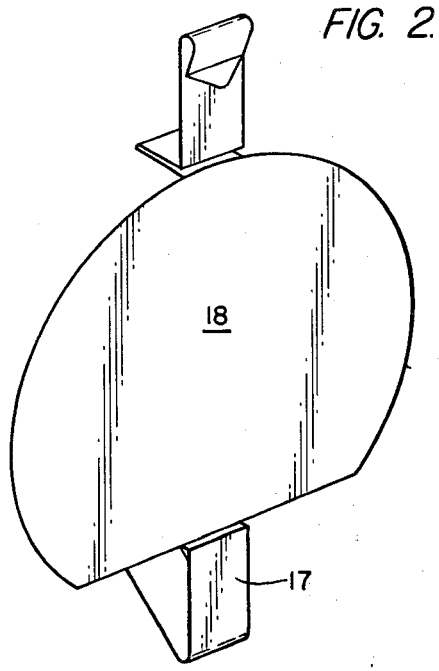
FIG. 2 shows the bottom of the feed pot lid.
Figure 3:
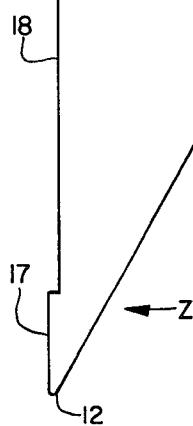
FIG. 3 shows a side view of the feed pot lid.

One end Z of the lid along its length (drawing FIG. 3) is looped 2 and bent back toward the center of the lid, so it can be fastened permanently to the crab pot, or ell pot, or fish pot, or lobster pot, over the feed pot opening thereof. When so fastened, it also slides 1, ¼ inch over the feed pot opening, to allow the opposite end X of the lid to be hooked temporarily to the crab pot, ell pot, fish pot, lobster pot. The end X that is hooked temporarily to the crab pot, or ell pot, or fish pot, or lobster pot, (the lid covering the feed pot opening) can be opened and closed as desired by putting a thumb and forefinger on the stub 15 of the hook 16, and sliding the lid to either hook or unhook the hook 16 of the feed pot lid.

Figure 4:
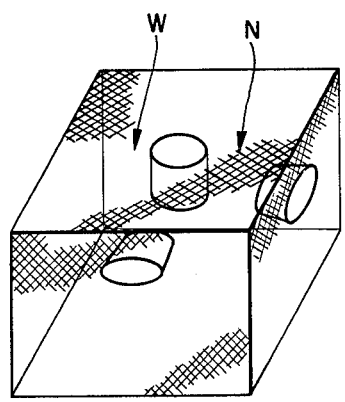
FIG. 4 shows a crab pot with the bottom up.
Figure 5:
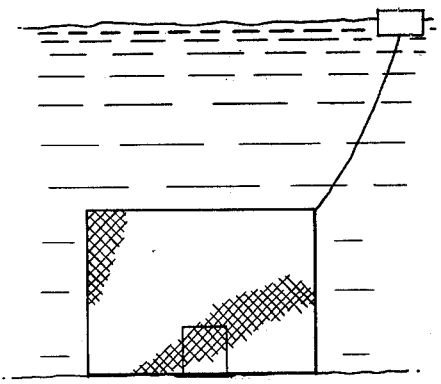
FIG. 5 shows how the crab pot made of wire sits on the bottom of a river or bay to catch crabs.
Figure 6:
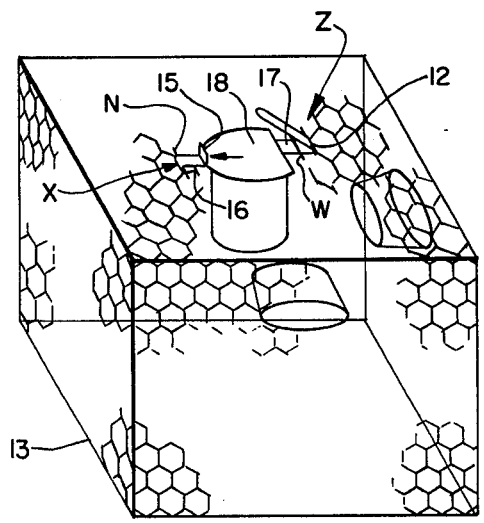
FIG. 6 shows the crab pot with the feed pot lid in place.

FIG. 4 shows a conventional type crab pot made of wire mesh and having a feed pot opening in the bottom thereof. The lid of this invention is used to cover this opening to prevent bait placed within the feed pot from coming out when the trap is in crab catching position as shown in FIG. 5. To use the lid, end X is hooked by the hinge end Z of the lid in the wire mesh at W, and then after bait is put into the feed pot through the opening as shown in FIG. 4, the hook end X of the lid is engaged with the wire mesh at N to fasten the lid.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim is:

1. A feed pot lid, which is made in one piece, and has a center which is three fourths round, and one fourth straight, means with said feed pot lid for permitting both slidable and pivotal movement thereof in relationship to a wire mesh marine life trap having a bait feed pot with an opening to the outside of the trap which the feed pot lid as installed normally covers including from the straight part of the lid a single extension which points away from the center, then loops, and points back to the center resulting in an open loop forming slidable and pivotal hinge structure extending from the straight part of the lid which is easily insertable into and engageable with the wire mesh of the trap, and further means provided with said feed pot lid for fastening the lid in a closed position over the opening of the feed pot of the trap including on the opposite round end of the center part, another single extension which points away from the center and then loops back toward the center, making a hook.

2. A feed pot lid according to claim 1 together with the wire mesh marine life trap having a bait feed pot opening, wherein the open looped end of the single extension of the slidable and pivotal hinge means is inserted and looped through the mesh of the wire and held thereby with the looped end of the lid thus forming the slidable and pivotal hinge structure of the lid in combination with the wire mesh of the trap.

3. A feed pot lid according to claim 2, wherein the opposite round end of the center part having the other single extension which is made into a hook, is hooked into the wire of the wire mesh marine life trap, or unhooked therefrom as desired in order to respectively fasten the lid over the feed pot opening of the trap, or to permit slidable movement of the hinge structure so the lid can be pivotally opened to add to or change feed bait in the feed pot.

4. A feed pot lid according to claim 3, wherein the center part completely covers the feed pot bait opening in the wire mesh marine life trap after the lid has been closed and the hinge structure slid so that the hook of the fastening means for the lid hooks into the wire mesh of the trap.

5. A device for use with a marine life trap made of wire mesh and having an opening therein for receiving feed bait into a feed pot of the trap comprising:

a one-piece lid for covering the feed pot opening of the marine life trap;

means on said lid for direct, positive and easily insertable engagement with the wire mesh of the marine life trap said means comprising a slidable, open loop pivot hinge structure for said lid to permit said lid to both pivot and move sidewise relative to the wire mesh of the trap a predetermined amount to either of two positions;

and further means on said lid for providing a grippable closure fastener for the lid which together with the wire mesh of said marine life trap will keep said lid closed over the opening of the feed pot of the trap when said lid is in one of the two positions and when in the other of the two positions will permit the lid to be pivotally opened so feed bait can be added to the feed pot of the trap.

6. A device as set forth in claim 5, wherein said means for providing a slidable pivot hinge structure for said one-piece lid includes a single extension projecting from one edge of said lid which extends outwardly therefrom and then said extension being looped back towards the lid to form said open loop which includes the slidable pivot hinge structure of said lid.

7. A device as set forth in claim 6, wherein the said extension projecting from one edge of said one-piece lid is provided with a recess between shoulder portions with said shoulder portions forming the limits of the said two positions when said lid is mounted on the wire mesh marine life trap.

8. A device as set forth in claim 5, wherein said further means for providing a grippable closure fastener for the one-piece lid includes a hook extension projecting outwardly from one edge of said lid having a portion looped back toward the lid for providing the fastener for engagement with the wire mesh of the marine life trap.

9. The structure set forth in claim 8, wherein said further means for providing a grippable closure fastener also includes a stub portion provided on said extension for gripping by a finger and thumb of a user for sliding the lid between said two positions.

10. A device for catching marine life comprising:
a trap formed of wire mesh material;
said trap provided with a feed bait holder having an opening to the outside of said trap;
a lid of one piece to cover said opening of the feed bait holder;
said one-piece lid provided with a single, both pivotable and slidable hinge structure at one edge thereof to permit opening and closing of said lid over said opening, said hinge structure is comprised of an open loop so that it is easily insertable and engageable with the wire mesh of the trap;
a clasp portion opposite to said single, both pivotable and slidable hinge structure on the other side of said lid for engagement with the wire mesh of said trap to secure said lid when closed against inadvertent opening thereof, and a stub handle integral with said clasp portion and projecting outwardly therefrom for easy and ready gripping by a thumb and forefinger of a person desiring to open the lid by sliding same sidewise with the single hinge structure until the clasp portion is disengaged from the wire mesh and then opening the lid pivotally around the single hinge structure in order to add feed bait to the marine life trap, and thereafter close the lid over the opening by pivotally moving the lid around the hinge structure, and then to secure same against inadvertent opening by sliding the lid again sidewise until the clasp portion is again engaged with the wire mesh to prevent loss of the feed bait from the trap.

11. The structure as set forth in claim 10, wherein said single, both pivotable and slidable hinge structure is further provided with a short recessed portion having shoulders at each end thereof for providing limit stops for the slidable movement of said lid with respect to the wire mesh of the trap so as to permit sufficient slidable movement to enable the clasp portion opposite said hinge from being latched and unlatched with respect to the wire mesh.

* * * * *